A. D. JACK.
BRAKE LEVER SET.
APPLICATION FILED SEPT. 17, 1918.
1,304,317.
Patented May 20, 1919.
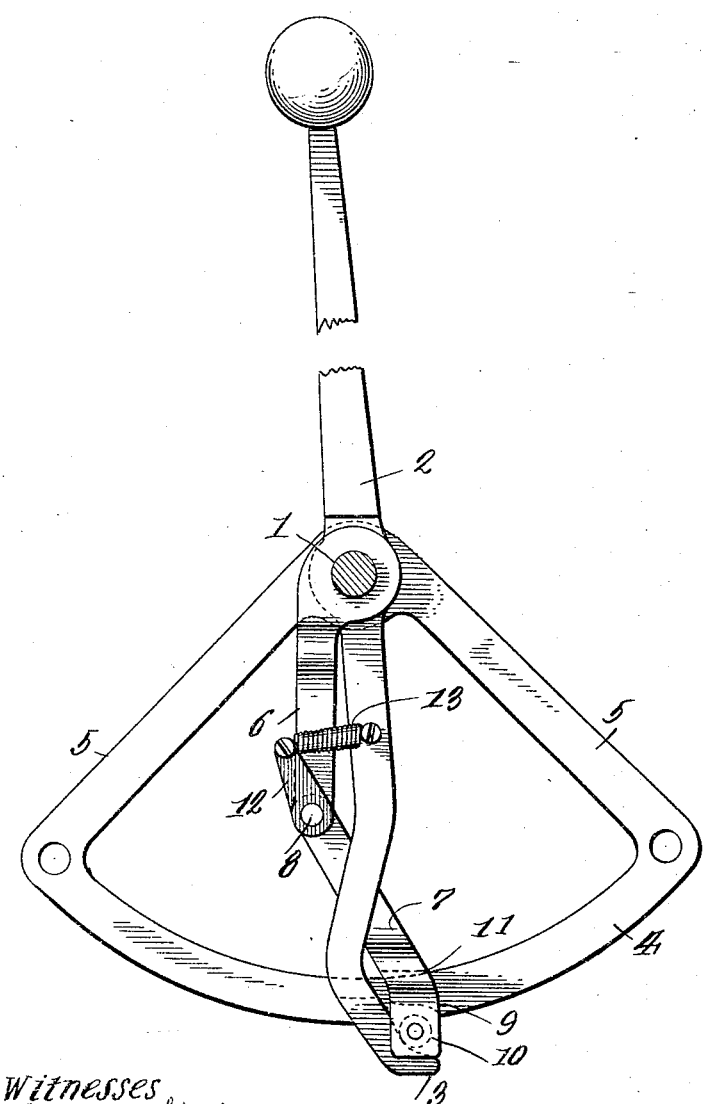
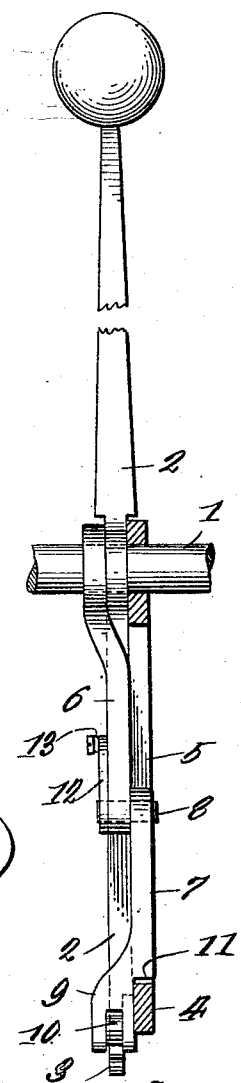
Witnesses
Guy M. Spring
V. B. Hillyard.
Inventor
Arthur D. Jack
By Richard B. Owen
Attorney

UNITED STATES PATENT OFFICE.

ARTHUR D. JACK, OF WINFIELD, KANSAS.

BRAKE-LEVER SET.

1,304,317.   Specification of Letters Patent.   Patented May 20, 1919.

Application filed September 17, 1918. Serial No. 254,430.

*To all whom it may concern:*

Be it known that I, ARTHUR D. JACK, a citizen of the United States, residing at Winfield, in the county of Cowley and State of Kansas, have invented certain new and useful Improvements in Brake-Lever Sets, of which the following is a specification.

In the operation of the ordinary brake lever several movements are required to be performed when releasing the brake mechanism, it being usually necessary to draw back upon the brake lever to release the holding means, then to exert a pressure to effect a release of the holding means, and finally to throw the lever forward to release the brake. This manner of operation is objectionable because of the time required to effect the several movements essential to a release or the setting of the brake mechanism of a vehicle.

This invention provides means of coöperating with a brake lever, whereby the latter may be actuated by a single movement to effect either a release or a setting of the brake as may be required.

In accordance with the present invention toggle members are provided and disposed so as to coöperate with the brake lever and with a curved bar or quadrant so that the brakes may be set or released by a single movement of the brake lever.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the accompanying drawings,

Figure 1 is a side view of a brake lever and adjunctive means embodying the invention, Fig. 2 is a front view of the parts shown in Fig. 1, the quadrant being in section.

Corresponding and like parts are referred to in the following description and indicated in both views of the drawing by like reference characters.

The numeral 1 designates an axle or shaft which has connection in any well known manner with the brake mechanism of a vehicle. An operating or brake lever 2 is mounted loosely upon or in line with the shaft 1 and its lower end terminates in a forward extension 3 which is inclined on its upper side so as to operate by a wedging action.

A curved bar 4 is disposed concentric with the shaft 1 and has radiately disposed elements 5 connected with its ends and forming the curved bar 4 with a quadrant. The sides of the curved bar 4 are smooth and are free from teeth such as commonly provided in curved bars constituting securing means for brake levers.

The arm 6 is secured to the shaft 1 in any manner so as to turn therewith. A majort portion of the arm 6 is offset so as to lie in the path of the lower portion of the brake lever 2. This is indicated most clearly in Fig. 2. A second arm 7 is pivotally connected to the lower end of the arm 6 by means of a suitable fastening 8. The arm 7 is disposed in the plane of the curved bar 4 and is adapted to engage the inner or upper edge of the bar 4. The lower end of the arm 7 is formed with a lateral offset 9 which extends along a side of the bar 4 and has its lower end notched to receive a roller 10 which is adapted to be engaged by the inclined extension 3 of the brake lever 2. The lower forward corner of the arm 7 is adapted to engage the inner or upper edge of the bar 4 and thereby secure the brake lever and hold the brake mechanism applied when the brakes are set. The end of the arm 7 in the rear of the engaging edge 11 is inclined so as not to make contact with the inner edge of the bar 4, as indicated by the dotted lines in Fig. 1. In this manner the edge 11 is pronounced so as to make firm biting engagements with the inner edge of the bar 4 to hold the lever 2 in the required position. The arms 6 and 7 constitute in effect toggle members.

A short arm 12 projects in an opposite direction to the arm 7 and is connected thereto by means of the fastening 8. A contractual spring 43 of the helical type is connected at one end to the arm 12 and at its opposite end to the lower portion of the brake lever 2. The spring 13 normally holds the arm 6 in close relation to the lower portion of the brake lever 2 so as to obviate lost movement. The arm 12 is disposed upon the opposite side of the arm 6 to that upon which the arm 7 is located.

Fig. 1 represents the relative position of the parts when the brake lever 2 is held fast and the brakes are set. To release the brakes the upper end of the lever 2 is drawn backward thereby advancing the inclined end 3 thereof beneath the lower end of the arm or member 7 with the result that such arm or member 7 is lifted a distance to cause the biting edge 11 to clear the upper or inner edge of the bar 4 and a continued movement of the lever 2 will effect a release of the brake mechanism. To set or apply the brake the upper end of the lever 2 is moved forwardly thereby withdrawing the inclined end 3 from beneath the lower end of the arm or member 7 a distance to permit of the biting edge 11 coming in contact with the upper edge of the bar 4 and a continued movement of the lever will cause the arm 6 to move rearwardly and carry the arm 7 therewith, whereby the edge 11 is caused to ride over the upper edge of the bar 4. When the upper end of the lever 2 has moved sufficiently to meet the brake mechanism and is released the edge 11 of the arm 7 will instantly bite into the upper edge of the bar 4 and prevent forward movement of the lower end of the arm or member 7 which is the tendency by reason of the strain on the parts due to the action of the brake mechanism when applied.

From the foregoing taken in connection with the accompanying drawing it will be understood that the invention provides means coöperating with a brake lever, whereby the brake mechanism may be set or released by a single movement of the brake lever in the proper direction, thereby avoiding the several movements incident to operating the usual brake lever. The roller 10 simply relieves the friction between the elements 3 and 9.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In combination, a brake lever, a member mounted concentric with the brake lever and having a portion in the path thereof, a curved bar concentric with the brake lever, and a second member pivoted to the outer end of the first mentioned member and adapted to have its outer portion engage the inner edge of the said curved bar.

2. In combination, a brake lever, a curved bar concentric with the brake lever, a member mounted concentric with the brake lever, a second member pivotally connected to the outer end of the first mentioned member and having its outer portion engaging the inner edge of the curved bar, and an inclined extension at the relatively lower end of the brake lever to engage the second member and effect a lifting and a forward movement thereof when the upper end of the brake lever is moved relatively in a rearward direction.

3. In combination, a brake lever pivotally supported between its ends and having a forwardly inclined extension at its lower end, an arm mounted concentric with the brake lever and having a portion disposed in the path thereof, a second arm pivoted to the outer end of the first mentioned arm, and having an edge portion at its outer end to engage the inner edge of the curved bar and formed with a laterally offset portion to be engaged by the inclined extension of the brake lever, and a yielding connection between the brake lever and the said arm.

4. In combination, a shaft, a brake lever loose on the shaft and having a forwardly inclined extension at its lower end, a curved bar concentric with the shaft, an arm secured to the shaft, a second arm pivotally connected to the outer end of the first mentioned arm and having an edge portion at its outer end to engage the inner edge of the curved bar and provided with a laterally offset portion to be engaged by the inclined extension of the brake lever, a third arm projecting in an opposite direction to the second arm and connected for movement therewith, and a yieldable connection between the third arm and the down portion of the brake lever.

In testimony whereof I affix my signature in presence of two witnesses.

ARTHUR D. JACK

Witnesses:
ELVIE J. CAIRNS,
J. W. HANLEN.